(12) United States Patent
Busi et al.

(10) Patent No.: US 9,172,630 B2
(45) Date of Patent: Oct. 27, 2015

(54) METHOD FOR CLIENT DATA TRANSMISSION THROUGH A PACKET SWITCHED PROVIDER NETWORK

(75) Inventors: Italo Busi, Cerro Maggiore (IT); Christian Addeo, Pordenone (IT)

(73) Assignee: Alcatel Lucent, Boulogne-Billancourt (FR)

( * ) Notice: Subject to any disclaimer, the term of this patent is extended or adjusted under 35 U.S.C. 154(b) by 93 days.

(21) Appl. No.: 13/262,137

(22) PCT Filed: Apr. 1, 2010

(86) PCT No.: PCT/EP2010/054398
§ 371 (c)(1),
(2), (4) Date: Sep. 29, 2011

(87) PCT Pub. No.: WO2010/118964
PCT Pub. Date: Oct. 21, 2010

(65) Prior Publication Data
US 2012/0020206 A1 Jan. 26, 2012

(30) Foreign Application Priority Data
Apr. 16, 2009 (EP) .................................. 09290280

(51) Int. Cl.
*H04L 12/703* (2013.01)
*H04L 12/26* (2006.01)
*H04L 12/701* (2013.01)
*H04L 12/24* (2006.01)
(Continued)

(52) U.S. Cl.
CPC ............... *H04L 45/00* (2013.01); *H04L 12/24* (2013.01); *H04L 41/00* (2013.01); *H04L 45/02* (2013.01); *H04L 45/021* (2013.01); *H04L 45/18* (2013.01); *H04L 45/22* (2013.01); *H04L 45/28* (2013.01); *H04L 45/36* (2013.01); *H04L 45/66* (2013.01); *H04L 45/741* (2013.01); *H04L 41/12* (2013.01); *H04L 45/26* (2013.01)

(58) Field of Classification Search
None
See application file for complete search history.

(56) References Cited

U.S. PATENT DOCUMENTS 6,154,462 A  11/2000  Coden
6,331,985 B1  12/2001  Coden
(Continued)

FOREIGN PATENT DOCUMENTS

CN  1324536  11/2001
JP  2004520786  7/2004
(Continued)

OTHER PUBLICATIONS

ITU-T Standard, International Telecommunication Union, Geneva; Ethernet Ring Protection Switching; G.8032/Y.1344; CH, No. G.8032/Y.1344, Jun. 22, 2008, XP017433808.
(Continued)

*Primary Examiner* — Jutai Kao
(74) *Attorney, Agent, or Firm* — Patti & Malvone Law Group, LLC

(57) ABSTRACT

In order to provide a redundancy mechanism in a packet switched provider network, which allows faster recovery from a failure, it is proposed that in case of a failure, a redundancy mechanism is initiated to reroute packet transmission through the provider network via an alternate path and an address withdrawal message is sent to network nodes along the failed path using data plane protocol. A network node receiving the address withdrawal message will flush MAC addresses it had learned before.

8 Claims, 9 Drawing Sheets

(51) Int. Cl.
*H04L 12/751* (2013.01)
*H04L 12/755* (2013.01)
*H04L 12/705* (2013.01)
*H04L 12/707* (2013.01)
*H04L 12/56* (2006.01)
*H04L 12/721* (2013.01)

(56) References Cited

U.S. PATENT DOCUMENTS

| | | | |
|---|---|---|---|
| 7,065,095 | B2 | 6/2006 | Coden |
| 7,106,711 | B2 | 9/2006 | Otting et al. |
| 7,194,005 | B1 | 3/2007 | Coden |
| 2001/0021177 | A1 | 9/2001 | Ishii |
| 2001/0048687 | A1 | 12/2001 | Coden |
| 2002/0186675 | A1 | 12/2002 | Otting et al. |
| 2007/0253326 | A1* | 11/2007 | Saha et al. ............ 370/217 |
| 2008/0049621 | A1 | 2/2008 | McGuire et al. |
| 2009/0168647 | A1* | 7/2009 | Holness et al. ........ 370/228 |
| 2009/0274155 | A1* | 11/2009 | Nakash ............ 370/395.53 |
| 2009/0296568 | A1 | 12/2009 | Kitada |
| 2009/0323687 | A1* | 12/2009 | Nishimura ............ 370/389 |

FOREIGN PATENT DOCUMENTS

| | | |
|---|---|---|
| JP | 2008527772 | 7/2008 |
| WO | WO 2007/144870 | 12/2007 |
| WO | 2008111173 | 9/2008 |
| WO | 2008120267 | 10/2008 |

OTHER PUBLICATIONS

Pranjal Kumar Dutta et al; Signaling Standby State of Pseudowire Groups in H-VPLS; draft-pdutta-12vpn-hvpls-standby-00.text; IETF Standard-Working-Draft, Internet Engineering Task Force, IETF, CH, Oct. 16, 2006, XP015048430 ISSN: 0000-0004.

Praveen Muley et al; Preferential Forwarding Status Bit Definition; draft-muley-dutta-pwe3-redundancy-bit-00.txt; IETF Standard-Working-Draft, Internet Engineering Task Force, IETF, CH, Feb. 25, 2007, XP015050234, ISSN: 0000-004.

Sato, K. et al; Study on Ethernet ring control mechanism based on Ethernet OAM; IEICE Technical Report, vol. 106, No. 304, The Institute of Electronics, Information and Communication Engineers, Oct. 12, 2006, pp. 65-70.

IEEE Standards; IEEE Standard for Local and Metropolitan Area Networks; Media Access Control (MAC) Bridges; IEEE Std 802.1D; 2004; (Revision of IEEE Std 802.1D-1998); Jun. 9, 2004; IEEE Computer Society.

Lasserre, M. et al; Virtual Private LAN Service (VPLS) Using Label Distribution Protocol (LDP) Signaling; IETF RFC 4762; Jan. 2007; Standards Track; The IETF Trust; 31 pages.

International Telecommunication Union; ITU-T Recommendation Y.1731; Series Y: Global Information Infrastructure, Internet Protocol Aspects and Next-Generation Networks; Internet Protocol Aspects—Operation, administrations and maintenance; OAM functions and mechanisims for Ethernet based networks; Feb. 2008.

Andersson, L. Ed et al; Framework for Layer 2 Virtual Private Networks (L2VPNs); Network Working Group; RFC 4664; Category: Informational; Cisco Systems, Inc.; Sep. 2006; 44 pages; The Internet Society 2006.

Andersson, L. et al; LDP Specification; RFC 3036; Category: Standards Track; Cisco Systems, Inc.; Jan. 2001; 132 pages; The Internet Society 2001.

Martini, L. Ed. et al; Pseudowire Setup and Maintenance Using the Label Distribution Protocol (LDP); RFC 4447; Category: Standards Track; Tellabs; Apr. 2006; 33 pages; The Internet Society 2006.

Dutta, Pranjal Kumar et al; LDP Extensions for Optimized MAC Address Withdrawal in H-VPLS draft-pdutta-12vpn-vpls-ldp-mac-opt-03.txt; L2VPN Working Group; Internet Draft; Intended Status: Standard; Expires Aug. 2008; [RFC4762] 17 pages; Alcatel-Lucent Feb. 2008.

IEEE Computer Society; IEEE Standard for Local and Metropolitan Area Networks, Virtual Bridged Local Area Networks, Amendment 4: Provider Bridges; Sponsored by the LAN/MAN Standards Committee; IEEE Std 802.1ad-2005; 74 pages; New York, NY; May 26, 2006.

IEEE Computer Society; IEEE Standard for Local and Metropolitan Area Networks—Virtual Bridged Local Area Networks, Amendment 7: Provider Backbone Bridges; Sponsored by the LAN/MAN Standards Committee; IEEE Std 802.1ah-2008; 110 pages; Jun. 12, 2008.

Kompella, K. Ed. et al; Virtual Private LAN Service (VPLS) Using BGP for Auto-Discovery and Signaling; Network Working Group; RFC 4761; Category: Standards Track; Juniper Networks; Jan. 2007; 28 pages; The IETF Trust 2007.

International Telecommunication Union; ITU-T; G.8031/Y.1342; Series G: Transmission Systems and Media, Digital Systems and Networks; Ethernet over Transport aspects—General Aspects; Series Y: Global Information Infrastructure, Internet Protocol Aspects and Next-Generation Networks; Internet Protocol aspects—Transport; Ethernet Protection Switching; ITU-T Recommendation G.8031/Y.1342; Jun. 2006.

International Telecommunication Union; ITU-T Recommendation Y.1373/G.8114 (Y.17tom) Operation & Maintenance Mechanism for T-MPLS Layer Networks; 64 pages.

\* cited by examiner

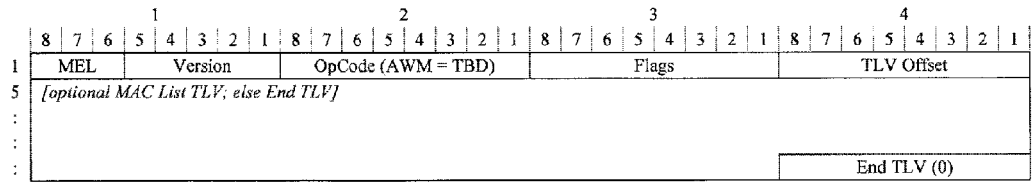
*Fig. 3*
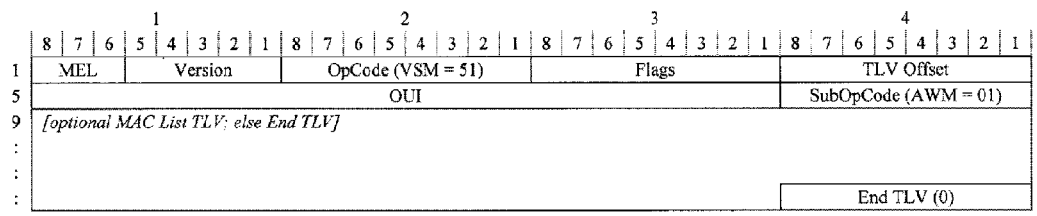
*Fig. 4*
| MEL | Four address bits "y" |
|---|---|
| 7 | F |
| 6 | E |
| 5 | D |
| 4 | C |
| 3 | B |
| 2 | A |
| 1 | 9 |
| 0 | 8 |
*Fig. 5*

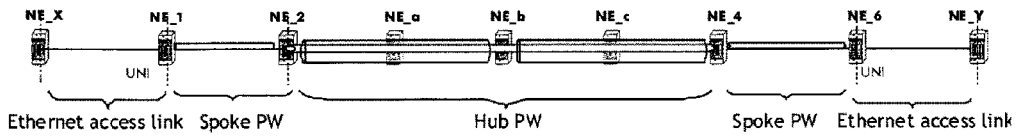
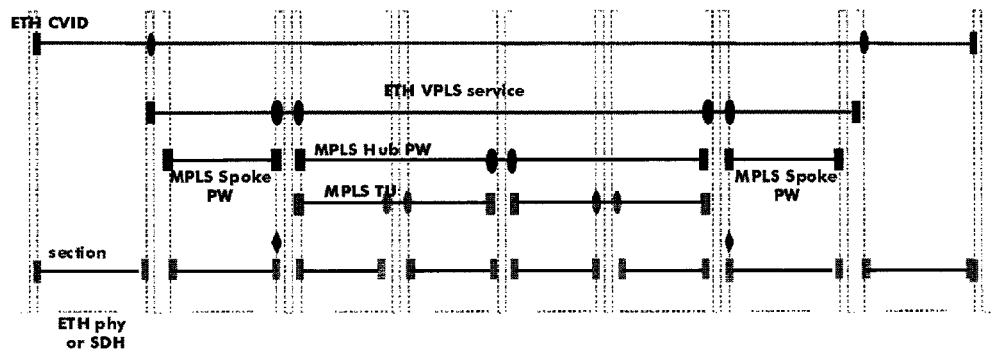
*Fig. 10*
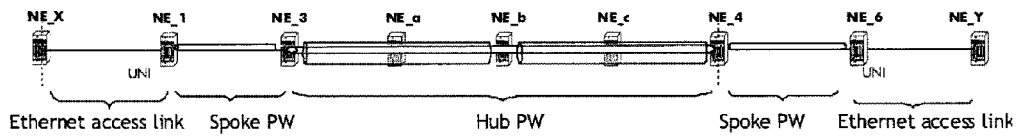
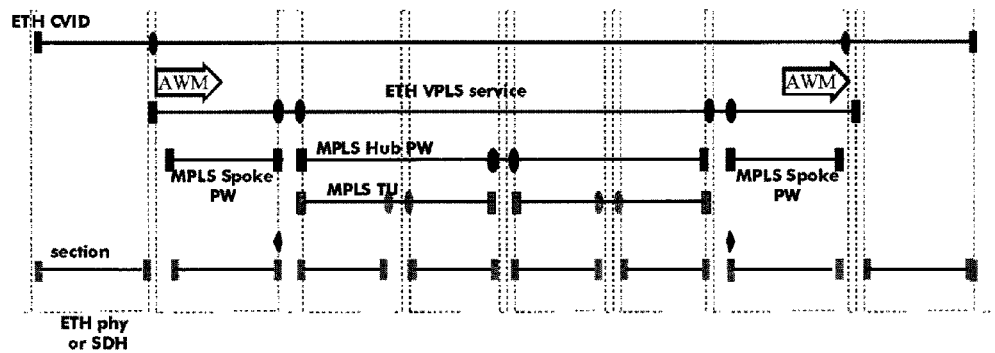
*Fig. 11*

METHOD FOR CLIENT DATA TRANSMISSION THROUGH A PACKET SWITCHED PROVIDER NETWORK

FIELD OF THE INVENTION

The present invention relates to the field of telecommunications and more particularly to a method and related apparatus for providing client data transmission through a packet switched provider network.

BACKGROUND OF THE INVENTION

While transport networks traditionally rely on time-division multiplexing (TDM) technology, techniques have recently been developed which allow native transport of packet services such as Ethernet traffic. A technology, which allows Ethernet transport through a provider network is known as Provider Bridge Network (PBN), where Ethernet switching devices in a provider network are termed Provider Bridges.

Ethernet frames contain physical source and destination addresses termed MAC addresses, where MAC stands for Media Access Control, a protocol for controlling access at the data link layer 2 in the OSI model.

The basic Ethernet standard IEEE 802.1 defines MAC address learning, a service that characterizes a learning bridge, in which the source MAC address of a received packet and the interface at which that packet was received are stored so that future packets destined for that address can be forwarded only to the bridge interface on which that address is located. Packets destined for unrecognized addresses are forwarded out every other bridge interface different from the interface the packet has been received from. This scheme helps minimize traffic on the attached LANs.

Ethernet bridged networks may use VLAN tags added to the Ethernet frames to define different and isolated broadcast domains over the same physical infrastructure. This technique can be useful in transport network to isolate traffic from different customers. Since VLAN tags can already be used by customers, a technique called Q-in-Q defined in IEEE 802.1ad expands the VLAN space by tagging the tagged packets, thus producing a "double-tagged" frame. A first VLAN tag called C-VLAN is available for customer purposes and a second VLAN tag called S-VLAN is than added by the service provider. VLAN-based provider bridge networks suffer from the limitation of 4096 VLAN IDs, thus making them impractical for use in large backbone networks.

Another technique, which is called MAC-in-MAC and which is defined in IEEE 802.1ah, neatly avoids this Layer 2 scaling issue and eliminates the need for core and backbone switches to learn hundreds of thousands of MAC addresses. This is achieved by adding at the edge node of the provider network backbone provider MAC addresses to the Ethernet frame.

An alternative technology for native Layer 2 transport is known as virtual private LAN service (VPLS), which uses Multi Protocol Label Switching (MPLS) technology. The basic defining elements of VPLS are virtual switch instances (VSI) and pseudo wires (PW). The VSI is a virtual MAC bridging instance with "split horizon" learning and forwarding. Split horizon forwarding means unknown MAC addresses received from one PW will not be forwarded to any other PW. This avoids forwarding loops. The PW is used to transport traffic between VSIs in different nodes. A full mesh of PWs is required to ensure that all nodes can be reached.

A VPLS network is established by first defining the MPLS label switched path (LSP) tunnels which will support the VPLS PWs. This can be achieved through IP-based signaling protocols. Paths are first determined using the Open Shortest Path First (OSPF) link-state protocol, which selects the shortest path for the LSP to a target destination. A full bidirectional mesh of LSPs needs to be established between all participating VPLS provider edge (PE) nodes. Label Distribution Protocol (LDP) or Resource Reservation Protocol—Traffic Engineering (RSVP-TE) is then used to distribute the label information. At a next step, PWs are established over the existing LSPs. This can be achieved using LDP (IETF RFC4762) or Border Gateway Protocol BGP (IETF RFC4761) to exchange PW labels.

Transport networks typically have a control plane, which is based on the GMPLS protocol suite, an extension of the MPLS-TE control protocols for transport applications, including OSPF-TE and RSVP-TE. For example, OSPF-TE will take bandwidth availability into account when calculating the shortest path, while RSVP-TE allows reservation of bandwidth.

The VPLS architecture is generic and is applicable on any suitable packet switched network. It is therefore possible to envisage a VPLS-like approach based on other tunnel mechanisms, such as T-MPLS, MPLS-TP, and PBB-TE.

An extension of VPLS is termed hierarchical VPLS (H-VPLS), which was designed to address scalability issues in VPLS. In VPLS, all provider edge (PE) nodes are interconnected in a full mesh to ensure that all destinations can be reached. In H-VPLS, a new type of node is introduced called the multi-tenant unit (MTU), which aggregates multiple customer edge (CE) connections into a single PE.

SUMMARY OF THE INVENTION

Provider networks typically provide some redundancy of network resources so that in case of a failure along a route through the network, packets can be switched via an alternate route. However, when MAC learning is applied, Provider Bridges along the old route still have the old MAC addresses learned, so that packets in reverse direction will be switched along the old, failed route, only, until either a time-out or a re-learning occurs. This behavior however adversely impacts the network recovery time.

It is hence an object of the present invention, to provide a method and related network node, which allows faster recovery from a failure in a packet-switched provider network.

These and other objects that appear below are achieved in that in case of a failure, a redundancy mechanism is initiated which reroutes packet transmission within the provider network via an alternate path and an address withdrawal message is sent to network nodes along the failed path using a data plane protocol. A network node receiving the address withdrawal message will flush the addresses it had learned before. Optionally, the address withdrawal message can contain an explicit list of MAC addresses to be removed.

In a preferred embodiment, the solution is based on the use of existing Ethernet Data Plane functions, such as Ethernet OAM, to convey the messages needed to implement MAC flushing, for quick recovery of traffic to the proper destination. This solution does not require IP-based signaling protocols such as LDP (Label Distribution Protocol) and is independent on the type of edge redundancy mechanism used.

In the embodiment, the solution is defined for Ethernet switched networks, but can also be applied to VPLS or H-VPLS networks (VPLS: Virtual Private LAN Service; H-VPLS: Hierarchical Virtual Private LAN service) deployed without Control Plane protocols, i.e. which are managed directly via a centralized network manager.

BRIEF DESCRIPTION OF THE DRAWINGS

Preferred embodiments of the present invention will now be described with reference to the accompanying drawings in which

FIG. 3 the format of a first embodiment of an Address Withdrawal Message using a new standard Ethernet OAM message;

FIG. 4 an alternative format of an Address Withdrawal Message using a vendor-specific OAM PDU;

FIG. 5 a table with codings used in the MEL field of FIG. 3 or 4;

FIG. 10 in a fourth embodiment, Ethernet transmission using H-VPLS technology;

FIG. 11 in the fourth embodiment, message flow in the case of a failure if the redundancy mechanism allows to detect the status change only at the user-provider edge node;

DETAILED DESCRIPTION OF EMBODIMENTS

Figure 1:
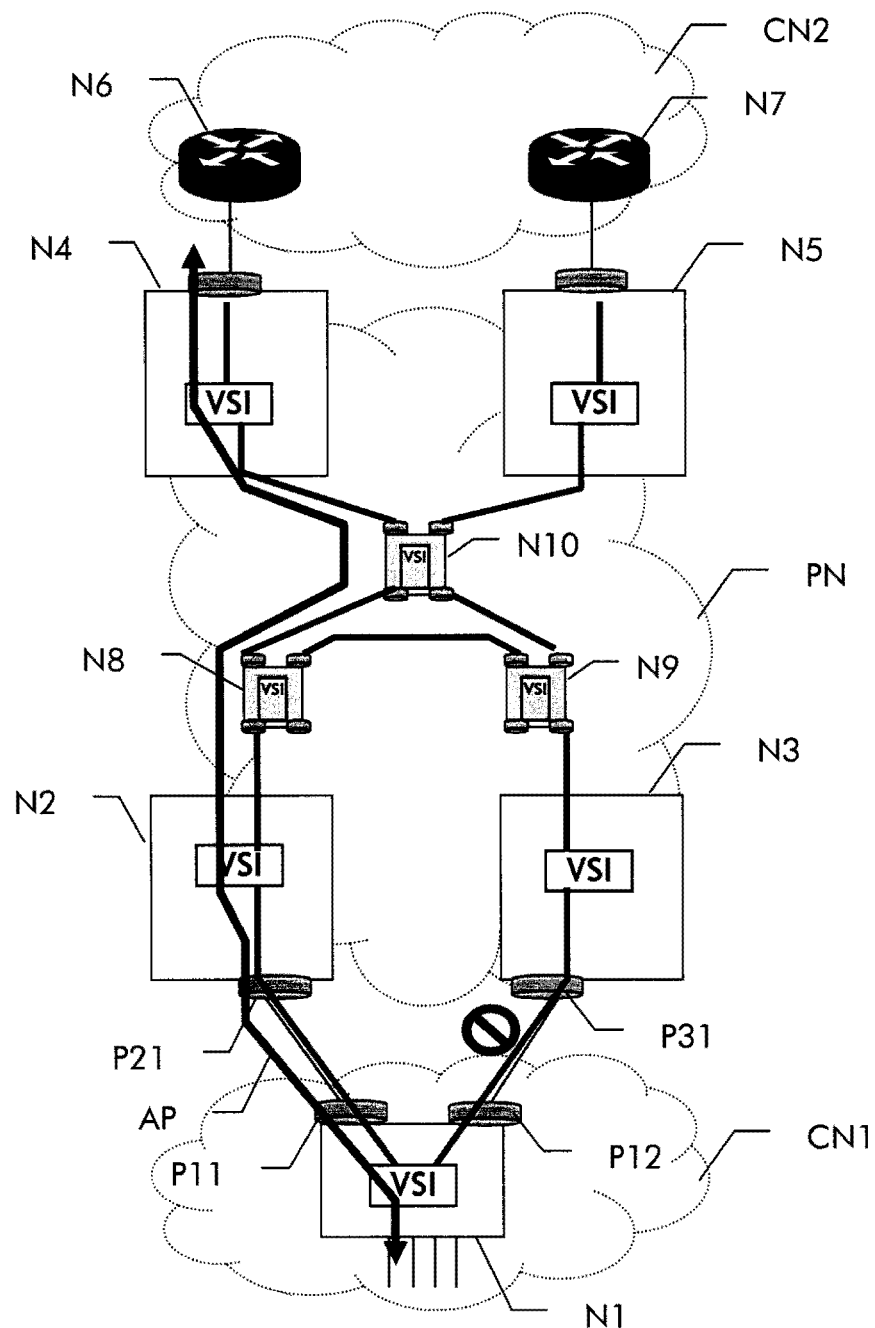
FIG. 1 shows a schematic provider network, which transports Ethernet traffic in both directions between different client devices.

An exemplary provider network PN is shown in FIG. 1. In this example, a customer has two customer network domains CN1, CN2 and wishes to interconnect his network domains over the provider network PN. A customer edge (CE) node N1 in customer network domain CN1 is connected via two separate connections to two provider edge (PE) bridge nodes N2, N3. This dual access serves for redundancy purpose. In particular, a redundancy mechanism is supported between nodes N1, N2, and N3, such that N1 exchanges traffic with either N2 or N3. In this example, a path between N1 and N2 is working while a path between N1 and N3 is inactive.

In customer domain CN2, a first customer edge node N6 is connected to a provider edge bridge node N4 and a second customer edge node N7 is connected to a provider edge bridge node N5. Network internal provider bridge nodes N8, N9, and N10 interconnect the provider edge bridge nodes N2, N3, N4, and N5. Data transmission between customer network domains CN1 and CN2 is switched over an active path AP from customer edge node N1 via provider bridge nodes N2, N8, N10, and N4 to customer edge node N6.

In the below embodiments, either all provider bridge nodes in the provider bridge network PN perform customer MAC address learning and forwarding as in case of PBN, or only VPLS PE nodes will perform MAC address learning as is the case for VPLS and H-VPLS. As explained above, MAC address learning is a service where a learning bridge node stores the source MAC address of a received packet and the interface at which that packet was received so that future packets destined for that address can be forwarded only to the bridge interface on which that address is located.

Let us assume that the MAC address of customer node N1 is α and MAC address of customer node N6 is β. Hence, a packet sent from N1 to N6 contains as destination address MAC β and as source address MAC α. Therefore, provider edge bridge node NE2 learns that MAC α is incoming from its port P21 and all other provider bridge nodes in the provider bridge network as incoming from the port connected to N2 on the active path AP.

Figure 2:
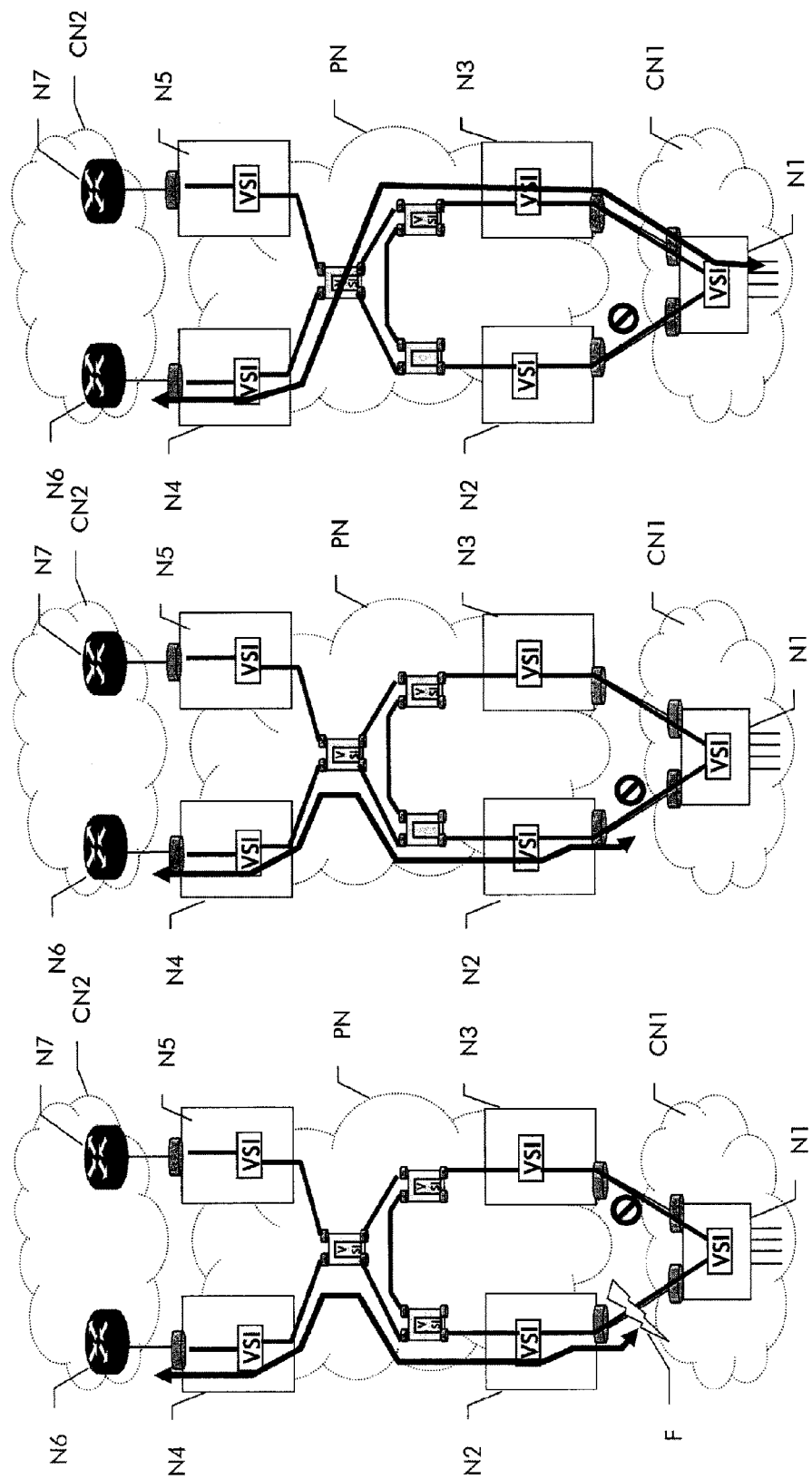
FIG. 2a shows a failure in the network of FIG. 1.
FIG. 2b shows that packets forwarded in the direction towards the failure are lost.
FIG. 2c shows that transmission is recovered over a redundant path in the network of FIG. 1.

FIG. 2a shows a failure F that affects the working Ethernet access link between N1 and N2. As a consequent action, the redundancy mechanism moves all traffic on the spare link between N1 and N3. This is shown in FIG. 2b. As from now on, packets with source address MAC α should be learned in at N3 as incoming at port P31 and at all other nodes in the provider network PN as incoming from the port connected to N3. Obviously, this port will be at least in some nodes different than the previous one along the former active path AP.

Anyhow, after initiation of the redundancy mechanism and switch over from N2 to N3 and until a packet with source address MAC α is not received by the provider network PN or until the aging time expires in all the nodes performing customer MAC address learning, the provider network PN continues to forward a packet coming from N6, with destination address MAC α, to N2. N2 on the other hand cannot deliver that packet to the destination node N1, due to the switch state of the redundancy mechanism. Node N2 hence acts as a "black hole" for packets destined to node N1. This behavior adversely impacts the network recovery time; since as a matter of fact, the communication through the provider network PN is not fully recovered until the blackholing condition is not removed by:

- either the reception of a packet with source MAC address α by node N4. In this case N4 re-learns MAC address α and starts sending packets to N3 that further forwards the packet to the correct customer edge node N1. However, the occurrence of this event is statistical and can take long time.
- or the expiration of the time out associated to the filtering entry of MAC address α. In this case N4 ages out MAC address α and starts flooding packets to all network nodes, including N3. N3 will then forward the packet to the correct customer edge node N1. This time-out can also take quite a long time: IEEE802.1d for example recommends 300 sec as default value.

This latency problem is currently not solved in standards about Ethernet switched network technology such as Provider Bridge networks. For MPLS-based VPLS networks, this problem is addressed in RFC4762 (Virtual Private LAN Service (VPLS) Using Label Distribution Protocol (LDP) Signal). The solution provided there is based on the usage of the LDP as control plane signaling protocol for MPLS-based networks, and assumes that the VPLS provider edge node is able to detect the status change of the edge redundancy mechanism. However, for Ethernet networks, no similar control plane is available. Moreover the status change is not necessarily visible to the provider edge node.

The present embodiments therefore intend to define a generalized solution to the blackholing problem of customer frames in order to cover also the following cases:
1. in VPLS networks, when the status change of the edge redundancy mechanism is detected only by the CE device and not by the PE device;
2. in VPLS/H-VPLS networks, when the VPLS/H-VPLS network elements do not support the control plane LDP signaling protocol for pseudo wire (PW) setup and maintenance; and
3. in Provider Bridge (PBB or PBB-TE) networks.

The embodiments therefore provide a solution to the blackholing problem for a provider network, which is based on the use of Ethernet data plane functions to convey a message to implement MAC flushing for quick recovery of traffic to the proper destination. The solution exploits the Ethernet data plane functions to propagate an address withdrawal message (AWM) packet that triggers MAC flushing in the provider network PN. The AWM packet is generated by the Ethernet switching node, which detects a change of the status of the edge redundancy protocol. This packet should be processed at every Ethernet switching node that performs customer MAC address learning and forwarding and should be forwarded hop-by-hop along the Ethernet active topology within the provider bridge network PN.

Different alternative mechanisms to carry the AWM packet within the Ethernet Data Plane to achieve the intended behavior will be described below. All these examples share the same high-level behavior.

In the first embodiment, use is made of Ethernet OAM (Operation, Administration, and Maintenance) functions. In particular, a new Ethernet OAM Protocol Data Unit (PDU) for the address withdrawal message is defined. The AWM can be defined either as a new standard OAM PDU or as a vendor-specific VSM OAM PDU, as defined in ITU-T Y.1731, which is incorporated by reference herein. An example of a new standard OAM PDU is shown in FIG. 3. An alternative example of a vendor-specific OAM PDU is shown in FIG. 4.

In FIG. 4, the AWM VSM message sub-type will be identified by a vendor specific OUI field and a SubOpCode field which may be chosen for example as 0x01 and indicates the MAC withdrawal purpose of the OAM PDU. The Multicast DA Class 2, as defined in Y.1731, is used for the AWM in order to make it being processed in any provider bridge nodes that needs to perform MAC flushing. The specific address of the Multicast DA Class 2 is chosen according to the MEL (MEL: MEG Level; MEG: Maintenance Entity Group) of the MIP (Maintenance Entity Group Intermediate Point) or MEP (Maintenance Entity Group Edge Point) the AWM is sent to.

The AWM packet could optionally contain one or more TLV elements (Type Length Value). In the above embodiment, an optional TLV called MAC List TLV is created, which provides a specific list of the only MAC addresses that have to be flushed for the relevant VPLS instance. The MAC list TLV is a field with a length of N×48 bytes indicating a list of MAC address to be removed.

It should be understood that different vendor-specific OAM PDU could be defined and used within the context of the above embodiment. It should be further understood that ITU-T Y.1731 defines different mechanisms for vendor-specific purposes, e.g. vendor-specific MCC OAM PDU. It may be possible that a future version of Y.1731 will define other mechanisms for vendor specific purposes, e.g. vendor specific SCC OAM PDU. The usage of any of these vendor-specific PDUs is technically feasible within the context of the above embodiment.

An Ethernet AWM frame is obtained by applying the Ethernet encapsulation to the Ethernet AWM OAM PDU. The MAC destination address should allow the neighboring node to identify the frame as an AWM frame and process it locally. The AWM OAM packet MAC destination address can be a 'Multicast Class 2 DA', as defined in ITU-T Y.1731 or the MAC address of the neighbor's port (if known). The MAC source address is the MAC address of the MEP or the MIP generating the AWM frame.

Y.1731 defines two types of multicast addresses depending on the type of OAM function:
   Multicast DA Class 1 for OAM frames that are addressed to all monitoring termination points (MEPs).
   Multicast DA Class 2 for OAM frames that are addressed to all monitoring intermediate points (MIPs) and to all monitoring termination points (MEPs).

In the present embodiment, use the Multicast DA Class 2 is preferred for AWM in order to make it being processed in any Ethernet nodes that need to perform MAC flushing. The Multicast DA Class 2 is chosen according to the MEL of the MIP/MEP the AWM is sent to. The coding of the Multicast DA Class 2 is shown in the table of FIG. 5. Note that the least significant nibble contains the level of the OAM layer, which a certain Ethernet OAM packet refers to.

In provider bridge networks, the S-VLAN tag can be present if the AWM OAM PDU is generated on a specific S-VLAN and will thus trigger the MAC flushing operation on that particular S-VLAN.

On user-network interface (UNI) links, the AWM OAM PDU can be generated on the section level and will thus trigger the MAC flushing operation on all the service instances, S-VLAN or VPLS instances, associated to that UNI. AWM OAM frames, generated on the section level, are typically untagged like for example section OAM PDUs.

In (H-)VPLS networks, the AWM OAM frames are untagged and pseudowire (PW) encapsulated. They therefore trigger the MAC flushing operation on the (H-)VPLS instance associated with the particular PW the frame has been received from.

The usage of the OAM channel to carry AWM messages has the advantage to rely on a well defined mechanism to implement proprietary extensions but it has the disadvantage to be slightly more complex in the general case where Maintenance Entity Group (MEG) nesting is considered. Additional details about protocol rules will be explained further below.

Figure 6:
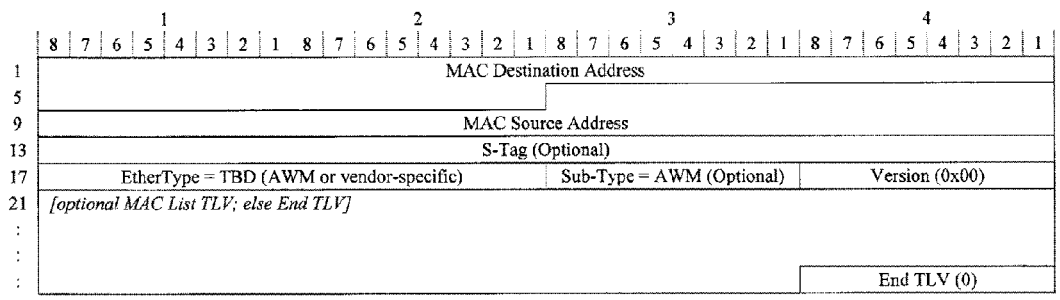
FIG. 6 the format of a second embodiment of an Address Withdrawal Message using a new, specialized Ethernet protocol frame.

In a second embodiment, the AWM is defined as a specialized new protocol. In particular, a new EtherType is defined for carrying the Address Withdrawal Message over Ethernet frames. The AWM frame format is shown in FIG. 6.

The AWM can be defined either as a new standard EtherType, as a vendor-specific EtherType or as a combination of a vendor-specific EtherType with Sub-Type. An Ethernet switching node when receiving such a packet processes it as an AWM according to the EtherType or the <EtherType, Sub-Type> field(s).

The MAC destination address should allow the neighbor node to identify the frame as an AWM frame and process it locally. There are different alternatives:
   All Provider Bridges MAC @
   Another Reserved Multicast MAC Address A proprietary multicast MAC Address.

The first two options (All Provider Bridges MAC @ or another reserved multicast MAC address) are more appropriate if a standard solution is developed although they can be also used if a proprietary solution is used.

The usage of a multicast MAC address dedicated to AWM (e.g. a proprietary multicast MAC address) can simplify the implementation of a fast forwarding option, as will be discussed below.

The MAC destination address can also be the MAC address of the neighbor's port (if known). The MAC source address is the MAC address of the port generating the AWM frame.

In provider bridged networks, the S-VLAN tag can be present if the AWM message is generated on a specific S-VLAN to trigger the MAC flushing operation on that particular S-VLAN.

On UNI links, the AWM message can be untagged to trigger the MAC flushing operation on all the service instances, S-VLAN or VPLS instances, associated to that UNI.

In (H-)VPLS networks, the AWM message is untagged and PW encapsulated. It will hence trigger the MAC flushing operation on the (H-)VPLS instance associated with the PW the frame has been received from. The optional MAC List TLV is the same as in the first embodiment.

In the following, general rules will be described, which improve implementation of the MAC flushing operation in the above embodiments.

If the edge redundancy mechanism allows to detect the status change only at the customer edge (CE), the CE has to generate either one untagged AWM packet to trigger MAC flushing on all the service instances associated with this CE, or one C-VLAN tagged AWM packet for each Ethernet Virtual Circuit (EVC) affected by the edge redundancy protection switch. In case of C-VLAN bundling, the AWM is generated only on the monitoring C-VLAN. Conversely, if the edge redundancy mechanism is detected at the provider edge (PE), the PE generates the AWM packet at the service layer (either (H-)VPLS or S-VLAN), affected by the edge redundancy protection switch.

Every edge node (PEB or U-PE) after receiving a C-VLAN tagged AWM, removes all the filtering database MAC entries learned on the service layer (either (H-)VPLS or S-VLAN) where the C-VLAN is mapped. If the OAM solution is used, the AWM is intercepted by the MIP at the C-VLAN level. If the ad-hoc solution is used, the AWM is intercepted because of the MAC DA of the AWM frame.

Every edge node (PEB or U-PE) after receiving an untagged AWM, removes all the filtering database MAC entries learned on each service layer (either VPLS or S-VLAN) associated with the UNI link from which the AWM has been received. If the OAM solution is used, the AWM is intercepted by the Section MEP. If the ad-hoc solution is used, the AWM is intercepted because of the AWM frame's MAC DA A provider edge bridge (PEB), after having performed the MAC flushing operation on a particular S-VLAN, generates an AWM along the active topology for that S-VLAN. If the OAM solution is used, the AWM is generated with the proper S-VLAN tag on each egress port along the active topology that is enabled for AWM. The MAC DA and the MEL are set on each port accordingly to the MEL of the MIP/MEP located on the neighboring PB node. If the ad-hoc solution is used, the AWM is generated, with the proper S-VLAN tag, on each egress port along the active topology that is enabled for AWM.

Every Provider Bridge node, after receiving an S-VLAN tagged AWM, removes all the filtering database MAC entries learned on that S-VLAN.

Every Provider Bridge node, after having performed the MAC flushing operation on a particular S-VLAN, generates the AWM along the active topology for that S-VLAN, excluding the port from which the AWM that has triggered the MAC flushing operation has been received. This process follows the same rules defined for the AWM generation in the PEB.

The VPLS PE or H-VPLS U-PE node, after having performed the MAC flushing operation on a particular VPLS instance, generates the AWM on all the pseudowires (PWs) associated with that VPLS. If the OAM solution is used, the AWM is generated as an untagged Ethernet frame that is encapsulated within each PW that is enabled for AWM. The MAC DA and the MEL are set on each PW accordingly to the MEL of the MIP/MEP located on the neighboring (H-)VPLS PE node. If the ad-hoc solution is used, the AWM is generated as an untagged Ethernet frame that is encapsulated within each PW that is enabled for AWM.

Each (H-)VPLS PE node, after receiving an AWM from a PW, removes all the filtering database MAC entries learned on the VPLS instance associated with that PW.

Each H-VPLS N-PE node, after having performed the MAC flushing operation on a particular VPLS instance, generates the AWM on all the PWs, excluding the PW from which the AWM that triggered the MAC flushing operation has been received, associated with that VPLS instance taking into consideration the split-horizon rule, i.e. the reception of an AWM from an hub PW does not trigger the generation of AWM on any hub PW, following the same rules defined for the AWM generation in the U-PE.

Each edge node (either U-PE or PEB) must not generate the AWM packets on the user-network interface (UNI) interfaces. It has to generate the AWM packets only on network-network interfaces (NNIs) in case of provider bridged network) and on Hub/Spoke PWs in case of (H-)VPLS network.

Since the embodiments do not use IP-based signaling protocols, no delivery mechanism, which guarantees safe delivery of a packet without duplication or data loss such as TCP (Transmission Control Protocol), is available. For sake of robustness, when AWM has to be generated, it is proposed to send the same AWM packet three times, with e.g. a transmission period of 3.33 ms. In reception, it is proposed that only one of the three OAM AWM packets, referring to the same operation, is used as trigger of MAC filtering entries. For instance, this can be implemented by preventing the NE to trigger the MAC filtering entries withdrawal due to an AWM packet received for a certain service, if another one has been received for the same service in the previous 10 ms or by delaying the MAC filtering entries withdrawal action by 10 ms after the first AWM packet is received. Should in an exceptional case, all three AWM packets get lost, the existing expiration time of learned MAC entries (e.g. 300 sec) can serve as a fallback position.

According to a further improvement, the number of flushed filtering database entries is optimized in that only entries which must be flushed rather than all the entries associated with a service instance are removed. In this case the AWM packet optionally contains a MAC List TLV. In reception, if the AWM packet contains a MAC List TLV, the NE removes only the listed MAC addresses (if present in the filtering database of that service instance). The usage of this TLV is optional.

It is also possible to optimize the flushing time. In this case the forwarding of the AWM packet is performed before its processing is completed. The triggers for this fast forwarding are the packet <destination MAC address, EtherType, Opcode> in the case of new standard OAM PDU, the packet <destination MAC address, EtherType, Opcode, OUI, Sub-OpCode> in the case of vendor-specific VSM PDU, the packet <destination MAC address, EtherType> in the case of new standard MAC withdrawal protocol, or the packet <destination MAC address, EtherType, Sub-Type> in the case of proprietary MAC withdrawal protocol).

If a proprietary ad-hoc solution with a proprietary multicast MAC DA or a standard solution with a dedicated reserved multicast DA is implemented, the trigger condition for fast forwarding can be based on the sole MAC DA field like in standard Ethernet forwarding.

In a Provider Bridged Network, provider edge bridge (PEB) and provider bridge (PB) nodes generate the AWM along a configurable sub-set of ports on the active topology in order to send AWM messages only to nodes that are capable to process them. In this way it is possible to solve the blackholing problem only for the traffic that is confined within the sub-network containing the nodes supporting the AWM feature.

In a (H-)VPLS Network, provider edge (PE) nodes generate the AWM along a configurable sub-set of PWs in order to send AWM messages only to nodes that are capable to process them. In addition to the Ethernet encapsulated AWM frame, PE nodes may generate also 'LDP Address Withdraw Message' as defined in RFC4762 for dynamic setup PWs that are not configured for the generation of AWM.

Even in cases where IP-based signaling protocols are available, the above described data-plane based solution may be preferable to optimize the flushing time.

In the following, embodiments for address flushing in the different transmission technologies will be described in more detail. In a third embodiment shown in FIG. 7, the provider network relies on VPLS technology. As in FIGS. 1 and 2a-c, a first customer edge node NE_1 is connected via the provider network PN to a second customer edge (CE) node NE_6. The CE nodes NE_1, NE_6 are connected via Ethernet access links to provider edge (PE) nodes NE_2, NE_4, respectively. Three intermediate provider nodes NE_a, NE_b, and NE_c are shown by way of example in FIG. 7. An MPLS LSP tunnel is established between NE_2 and NE_b via NE_a and another MPLS LSP tunnel is established between NE_b and NE_4 via NE_c. Over these MPLS LSP tunnels, a VPLS multi-segment pseudowire MS-PW is established between NE_2 and NE_4, which provides the connectivity between the VSIs on the VPLS PEs (NE_2 and NE_4) for the transport of the customer signal through the provider network.

Figure 7:
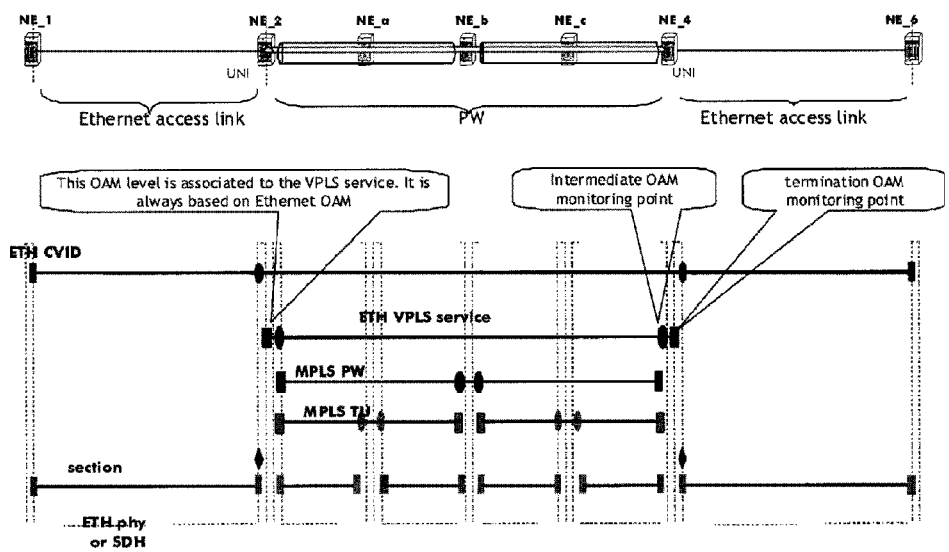
FIG. 7 in a third embodiment, Ethernet transmission using VPLS technology.

As in FIG. 1, a redundancy mechanism is implemented on the Ethernet access link between NE_1 and NE_2 and a third PE node NE_3 (not shown in FIG. 7). This dual access of NE_1 allows to reroute traffic in case of a failure (see FIG. 2a) via NE_3.

Ethernet monitoring termination points (MEPs) for the Ethernet VPLS layer are configured on the PE nodes NE_2, NE_4, which initiate and terminate the VPLS service. Ethernet monitoring termination points (MEPs) for the C-VLAN are configured on the CE nodes.

Figure 8:
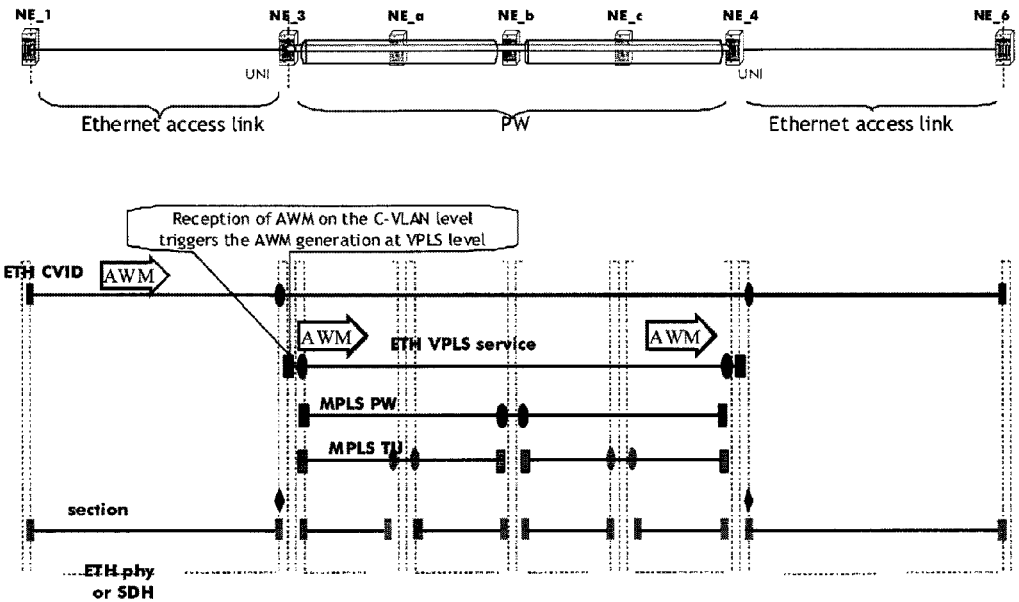
FIG. 8 in the third embodiment, message flow in the case of a failure if the redundancy mechanism allows to detect a status change at only the customer edge node.

FIG. 8 shows the message flow in the case that the redundancy mechanism allows to detect the status change only on the CE NE_1. When the redundancy mechanism protection switch occurs, the NE_1 removes all filtering database MAC addresses learned on the failed Ethernet access link and sends an OAM AWM packet on the newly working Ethernet access link to NE_3. This packet is generated at the C-VLAN level.

When NE_3 receives the AWM for a certain C-VLAN on the Ethernet access link, it removes all filtering database MAC addresses, learned on the VPLS instance where that C-VLAN is mapped to. Then NE_3 sends an AWM packet on all PWs of that VPLS instance.

In this particular case, NE_4 receives the AWM on the PW directly and as a consequence removes all MAC addresses learned on the corresponding VPLS instance. NE_4 does not have to further send the AWM packet to the remote UNI.

Figure 9:
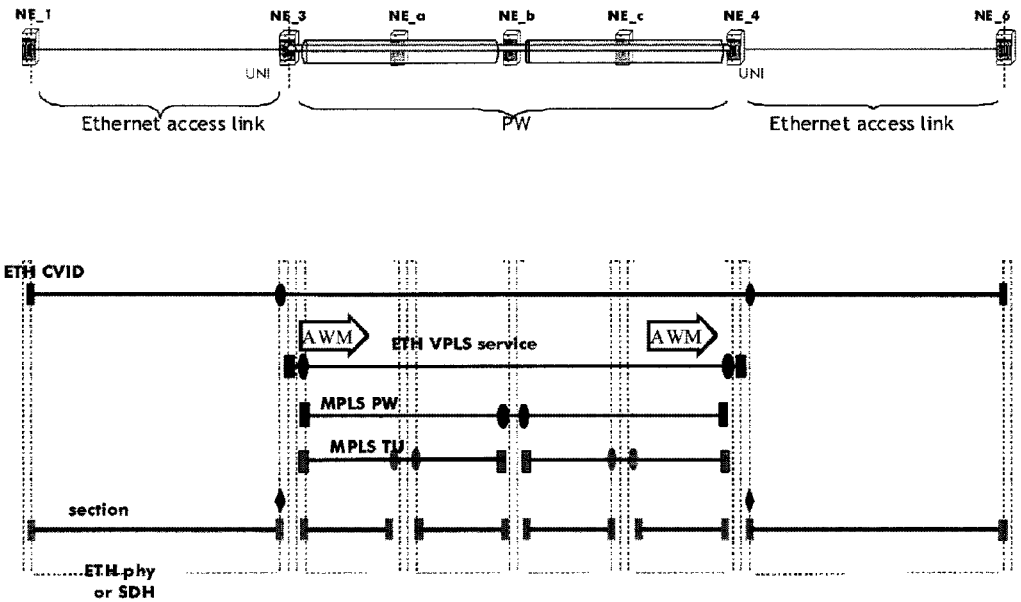
FIG. 9 in the third embodiment, message flow if the status change can be detected at the provider edge node.

In an alternative scenario shown in FIG. 9, the redundancy mechanism allows to detect the status change on the PE nodes, i.e. on node NE_3. In particular, when the redundancy mechanism protection switch occurs, NE_3 detects that the attached access link has become active. It hence removes all filtering database MAC addresses, learned on the VPLS instance, which has a service access point on that link. If more VPLS instances have a service access point on that link, the procedure is applied to all of them. NE_3 sends then an OAM AWM packet on all PWs of that VPLS instance. NE_4 receives the AWM on the PW and hence removes all MAC addresses learned on that VPLS instance. NE_4 does not have to further send the AWM packet to the remote UNI.

FIG. 10 shows in a fourth embodiment, the message flow in the case of H-VPLS technology. The scaling advantages of H-VPLS are obtained by introducing a hierarchy, thereby eliminating the need for a full mesh of LSPs and PWs between all participating PEs. The hierarchy is achieved by augmenting the base VPLS core mesh of PE to PE PWs referred to as hub PWs with access PWs called spoke PWs to form a two-tier hierarchical VPLS model.

In FIG. 10, a CE node NE_X is connected via an Ethernet access link to a UNI of a PE node NE_1. A spoke PW is implemented between NE_1 and NE_2. A hub PW exists between NE_2 and NE_4 leading over intermediate network nodes NE_a, NE_b, and NE_c. The hub PW uses a first MPLS LSP tunnel between NE_2 and NE_b through NE_a and a second MPLS LSP tunnel between NE_b and NE4 through NE_c. From NE_4, a spoke PW exists to the far end PE node NE_6, which has a UNI that connects via an Ethernet access link to NE_Y.

Ethernet monitoring termination points (MEPs) for the Ethernet VPLS layer are configured on the user-provider edge (U-PE) nodes, which initiate and terminate the VPLS service, i.e. NE_1 and NE_6. Ethernet monitoring intermediate points (MIPs) for the Ethernet VPLS layer are configured on the network-provider edge (N-PE) nodes, which the VPLS service pass through, i.e. NE_2 and NE4. Additionally, Ethernet monitoring termination points (MEPs) for the C-VLAN are configured on the CE nodes NE_X, NE_Y.

In FIG. 11, the situation is considered, where the redundancy mechanism allows to detect the status change on only the U-PE nodes NE_1, NE_6. In the case of a failure in the spoke PW, the following procedure takes place: When the redundancy mechanism protection switch occurs, NE1 removes all filtering database MAC addresses learned on that PW and sends OAM AWM packet on the newly working spoke PW to NE3. This packet is generated at the VPLS level. When NE3 receives the AWM on the spoke PW, it removes all filtering database MAC addresses learned on the VPLS instance, which that PW is associated to. NE3 sends then the AWM packet on all hub PWs of that VPLS instance. When NE4 receives the AWM on the hub PW, it removes all MAC addresses learned on the corresponding VPLS instance. If any spoke PWs were attached to NE4, it should send AWM packet on all Spoke PWs of that VPLS instance. Conversely, forwarding of the AWM on any other hub PWs is prevented by the VPLS split horizon function.

Figure 12:
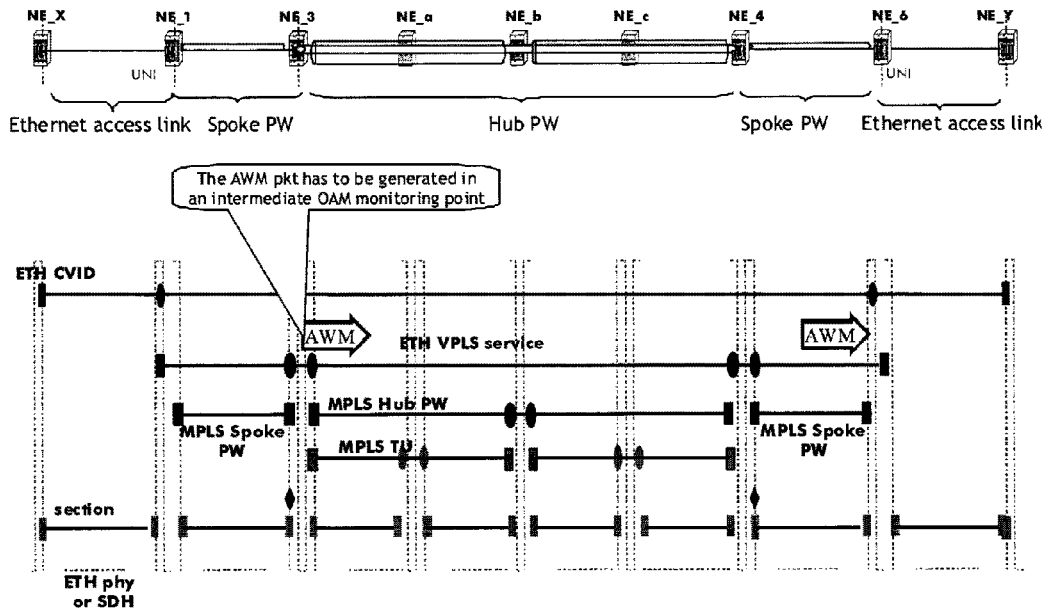
FIG. 12 in the fourth embodiment, message flow if the status change can be detected at the network-provider edge node.

FIG. 12 shows the situation, when the redundancy mechanism allows to detect the status change on the N-PE nodes NE_3, NE_4. In this case, the procedure is the following: When the redundancy mechanism protection switch occurs, NE3 detects that the attached Spoke PW has become active. It hence removes all filtering database MAC addresses, learned on the VPLS instance, which that PW is associated to. Then NE3 sends an OAM AWM packet on all Hub PWs of that VPLS instance.

When NE4 receives the AWM on the Hub PW, it remove all MAC addresses, learned on the corresponding VPLS instance. If any spoke PWs were attached to NE4, i.e. in this case NE6, this NE should send AWM packet on all spoke PWs of that VPLS instance, while forwarding on any other Hub PWs is prevented by the VPLS Split horizon function.

Figure 13:
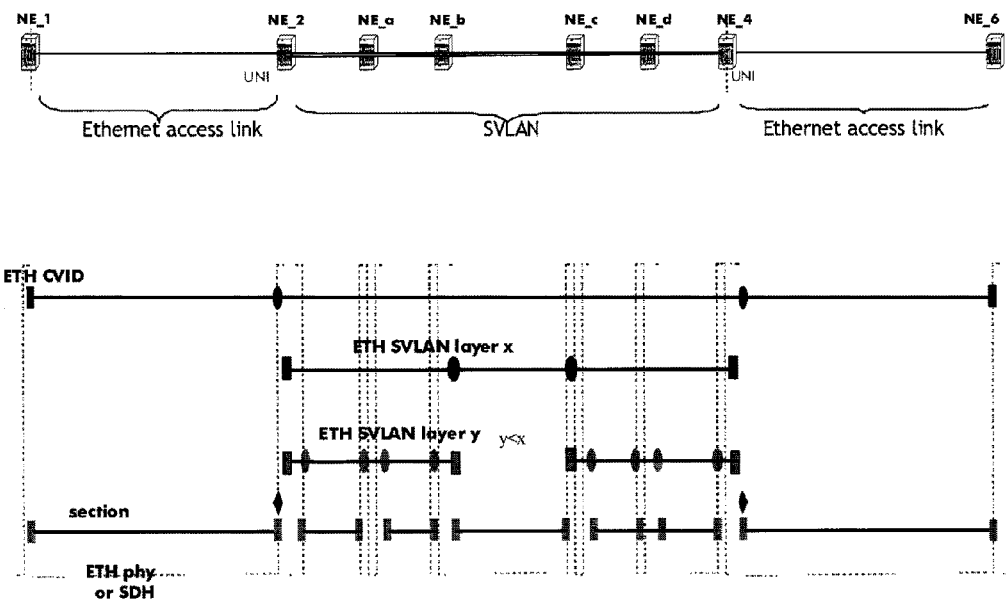
FIG. 13 in a fifth embodiment, Ethernet transmission using Provider Bridge Network technology.

In a fifth embodiment shown in FIG. 13, the provider network is a provider bridge network (PBN). In this embodiment there is a multi-domain Provider Bridged networks with two nested S-VLAN monitoring levels: one at the service-provider level monitoring the S-VLAN from UNI to UNI and another one at the network-operator level. This example allows to describe the behavior when there are multiple MEPs and MIPs for the same S-VLAN in the same node.

Similar to the architecture shown in FIG. 7, a first customer edge node NE_1 is connected via the provider network PB to a second customer edge node NE6. The CE nodes NE_1, NE_6 are connected via Ethernet access links to provider edge nodes N_2, N_4, respectively. Four intermediate provider nodes NE_a, NE_b, NE_c, and NE_d exist between NE2 and NE4.

Network nodes NE_2, NE_a, and NE_b belong to a first provider domain and an SVLAN MEG at level y exists between NE_2 and NE_b. Moreover, network nodes NE_c, NE_d, and NE_4 belong to a second provider domain and an SVLAN MEG exists at the same level y or a lower level z<xbetween NE_c and NE_4. In addition, an SVLAN MEG exists between NE_2 and NE_4 at the level x, with x>y.

In FIG. 13, Ethernet monitoring termination points (MEPs) for the Ethernet S-VLAN layer are configured on the PEBs NE2, NE4, which initiate and terminate the S-VLAN service. Ethernet monitoring intermediate points (MIPs) at level x are also configured on Provider Bridge nodes, NE_b and NE_c at the boundary between the two domains. In order to monitor the first domain, MEPs are configured at level y on NE_2 and NE_b with MIPs on NE_2, NE_a and NE_b. In order to monitor the second domain, MEPs are configured at level z on NE_c and NE_4 and MIPs on NE_c, NE_d and NE_4. Additionally, Ethernet monitoring termination points (MEPs) for the C-VLAN layer are configured on the CEs NE_1, NE_6.

Figure 14:
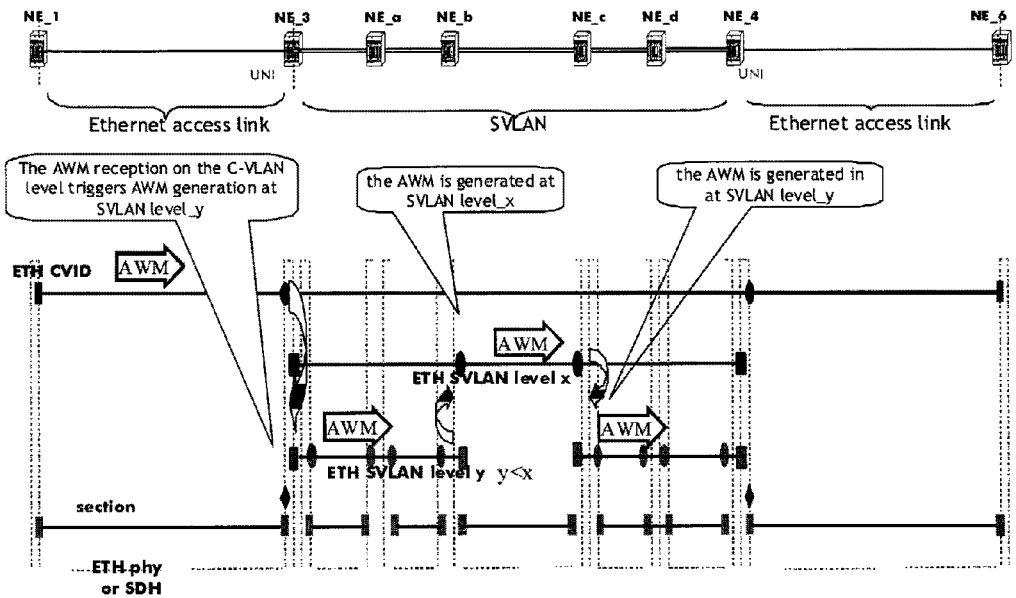
FIG. 14 in the fifth embodiment, message flow in the case of a failure if the redundancy mechanism allows to detect a status change at only the customer edge node.

FIG. 14 shows the message flow in the case when the redundancy mechanism allows to detect the status change on only the CE nodes NE_1, NE_6. When the redundancy mechanism protection switch occurs from, NE_1 removes all filtering database MAC addresses learned on the failed Ethernet access link and sends OAM AWM packet on the newly working Ethernet access link to NE_3. This packet is generated at the C-VLAN level.

When the NE_3 receives the AWM for a certain C-VLAN, it removes all filtering database MAC addresses, learned on the S-VLAN instance where that C-VLAN is mapped to. Then NE_3 sends an AWM packet on the S-VLAN instance.

If an OAM solution is used, the AWM is sent on ME level y in order to allow the MIP on NE_a to intercept the packet. NE_a also generates an AWM at the ME level y in order to allow the MIP on NE_b to intercept it. NE_b generates the AWM at the ME level x in order to allow the MIP on NE_c to intercept the packet. Conversely, if the ad-hoc message solution is used, the AWM packet is generated independently from the ME level architecture. NE4 does not have to further send the AWM packet to the remote UNI.

Figure 15:
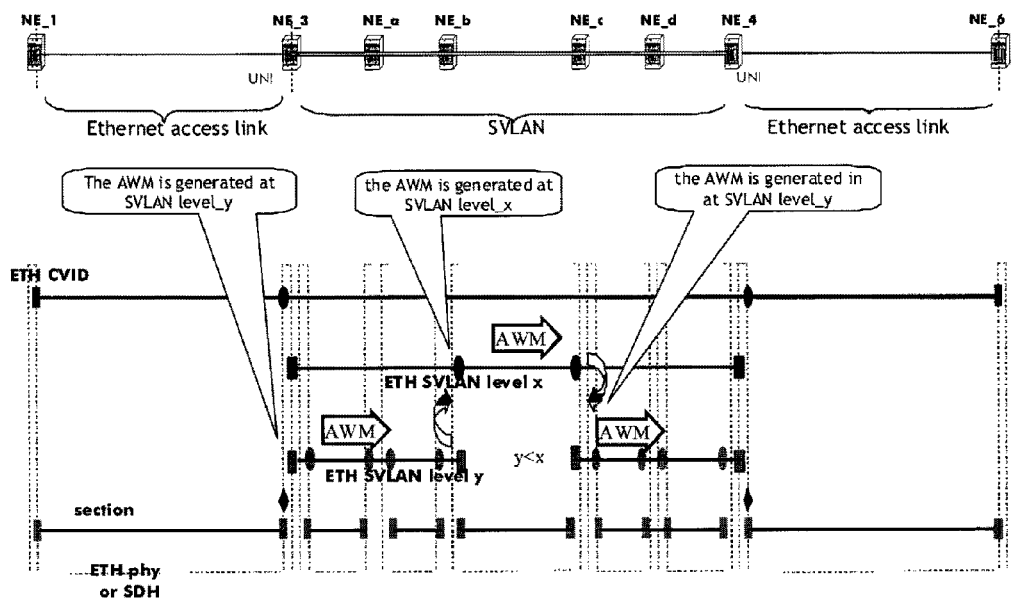
FIG. 15 in the fifth embodiment, message flow if the status change can be detected at the provider edge node.

FIG. 15 shows the message flow in the cases that the redundancy mechanism allows the PEB to detect the status change. When the redundancy mechanism protection switch occurs, new PE node NE3 detects that the attached Ethernet access link has become active. Hence, NE3 removes all filtering database MAC addresses, learned on the S-VLAN instance, which has a service access point on that link. If more S-VLAN instances have a service access point on that link, the procedure is applied to all of them. Then NE3 sends OAM AWM packet. The procedures for generation of AWM are the same as in the case before.

In the following, some redundancy mechanisms will be described, which can be used in the above embodiments. Different edge redundancy mechanisms are possible between a CE and two redundant PE nodes, including selective tunneling of Customer BPDU (Bridge Protocol Data Unit), i.e. of certain configuration messages in the layer 2 Spanning Tree Protocol (STP); and participation to Customer STP.

As mentioned, a first example of an edge redundancy mechanism is selective tunneling. In this edge redundancy mechanism, each PE, e.g. PE1 in FIG. 16, recognizes the Customer BPDUs frames coming from the CE and selectively tunnels them toward the other PE, e.g. PE2, that forwards them back to the CE.

Figure 16:
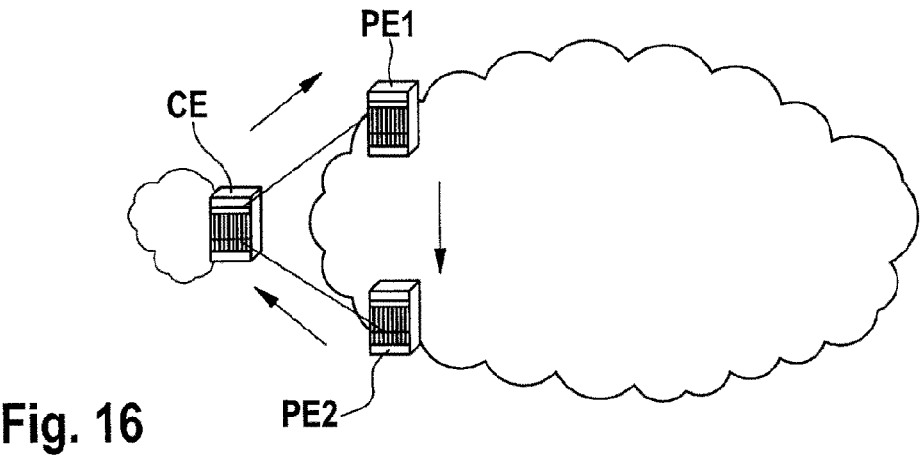
FIG. 16 a first example of an edge redundancy mechanism using selective tunneling of Customer BPDUs frames.

The Customer BPDU frames are transparently transported from one UNI link to the other UNI link. An example is shown in FIG. 16: the same Customer BPDU sent by CE to PE1 is delivered back to CE by PE2.

From the Customer STP point of view the provider network is seen as a LAN segment and the two UNIs are two links connected to the same LAN segment. The Customer STP instance running within the CE node, will elect one UNI as the Designated Port, e.g. the UNI connecting the CE to the PE1, and the other UNI as the Backup Port, e.g. the UNI connecting the CE to the PE2. The UNI associated to the Designated Port is the active UNI while the other is the stand-by UNI.

When the Link between CE and PE1 fails, CE detects the problem because it does not see the Customer BDPUs. As a consequence the Backup Port becomes the new Designated Port.

It has to be noted that this mechanism can work if and only if there are no backdoor links between remote sites connected to the same E-LAN so there is no need to run STP spanning the whole E-LAN.

This is an example of an edge redundancy mechanism where only the CE detects the status change. As the PEs transparently forward Customer BPDUs, there is no way for PE2 to be aware of the failure of the link between CE and PE1.

Another example of an edge redundancy mechanism involves participation of the PE nodes to Customer STP. In this edge redundancy mechanism, each PE recognizes the Customer BPDUs frames coming from the CE and processes them as defined in IEEE 802.1d. According to the STP state machine running on the PE; the PE can also generate Customer BPDUs toward the CE or toward the other PE.

Figure 17:
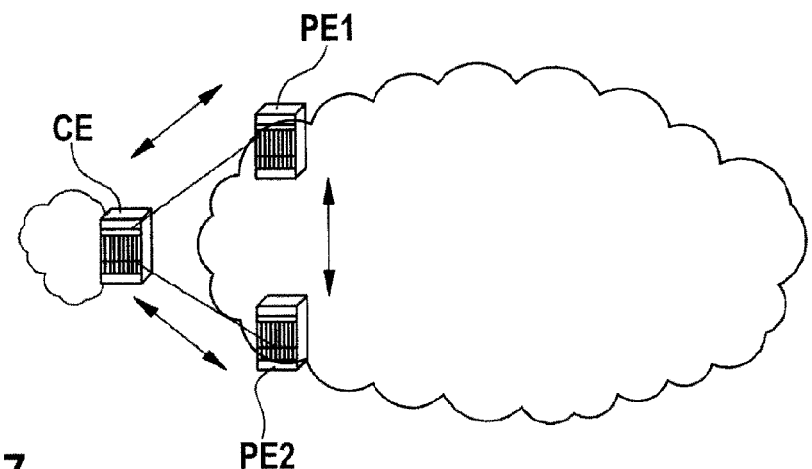
FIG. 17 a second example of an edge redundancy mechanism where provider edge node participate to the customer STP.
Figure 18:
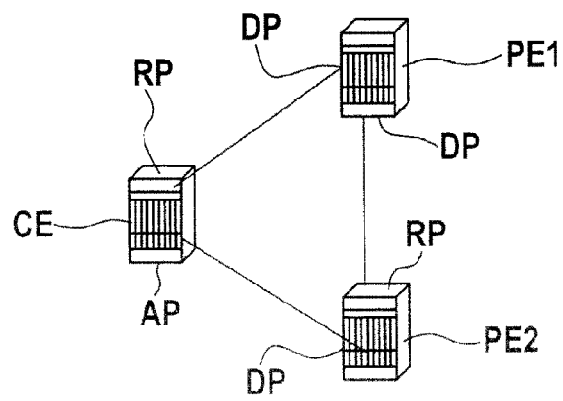

The Customer BPDU frames are processed in each node CE, PE1 and PE2 and generated accordingly to the procedures defined in IEEE802.1d. This is shown schematically by bidirectional arrows in FIG. 17. For example a Customer BPDU sent by CE to PE1 is processed by PE1. From the Customer STP point of view, the network topology is composed by a ring CE, PE1 and PE2 connected by point-to-point links, see FIG. 18.

The Customer STP is configured in such a way that PE1 is elected as the Root Port and that it will designate:
The CE port connected to PE1 as the Root Port
The CE port connected to PE2 as the Alternate Port
The UNI ports on PE1 and PE2 as the Designated Port
The PE1 virtual port connected to PE2 as the Designated Port
The PE2 virtual port connected to PE1 as the Root Port.

When the link between CE and PE1 fails, the CE port connected to PE2 changes its stated from Alternate Port to Root Port. A Topology Change Notification (TCN) PBDU is sent from the CE to PE2 causing PE2 to flush its MAC filtering entries and to detect that there was a status change.

It has to be noted that this mechanism can work only if there are no backdoor links between remove sites connected to the same E-LAN so there is no need to run STP spanning the whole E-LAN. This mechanism is also capable to ensure a quick recovery time if only CE, PE1 and PE2 are participating to the STP instance: the topology with three nodes is the ideal case for RSTP to quickly recover from failures.

This is an example of an edge redundancy mechanism where the PE can detect the status change. The reception of the TCN BPDU can trigger PE2 to start the MAC flushing procedure in accordance with the above embodiments.

Other edge redundancy mechanisms such as MC-LAG, dual-homing with G.8031 Ethernet Linear Protection switching are also possible in the context of the above embodiments.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

What is claimed is:

1. A method of client data transmission between two or more customer Ethernet networks through a packet switched provider network that does not use a control plane protocol, the customer Ethernet networks comprising one or more customer edge nodes operatively coupled to one or more provider edges nodes of the packet switched provider network, the method comprising the steps of:

providing packet transmission along a first path between a source customer edge node and a destination customer edge node through said provider network;

at one or more provider network nodes along said first path, performing Media Access Control (MAC) address learning to allow packet transmission in reverse direction along the same first path;

protecting said first path by a redundant second path between said source customer edge node and said destination customer edge node using a redundancy mechanism;

in case of a failure at said first path, initiating said redundancy mechanism to reroute packet transmission through said provider network via said second path; and after initiating said redundancy mechanism, sending, to said one or more provider network nodes that have performed MAC address learning, an address withdrawal message in the form of an Ethernet OAM message using a data plane protocol; and responsive to receiving said address withdrawal message, flushing addresses previously learned at the receiving network node.

2. A method according to claim 1, wherein said redundancy mechanism is an edge redundancy mechanism.

3. A method according to claim 1, wherein a status change of said redundancy mechanism is detectable only at a customer edge node and wherein said customer edge node creates said address withdrawal message and sends it to a provider edge node via an access link.

4. A method according to claim 1, wherein a status change of said redundancy mechanism is detectable at a provider edge node and wherein said provider edge node creates said address withdrawal message and sends it towards a far end provider edge node.

5. A method according to claim 1, wherein said address withdrawal message is an Ethernet protocol frame.

6. A method according to claim 1, wherein only provider edge nodes perform said address learning and address flushing steps.

7. A method according to claim 1, wherein said provider network is directly managed by a central network management instance.

8. A network element for controlling client data transmissions between two or more customer Ethernet networks through of a packet switched provider network that does not use a control plane protocol, the customer Ethernet networks comprising one or more customer edge nodes operatively coupled to one or more provider edges nodes of the packet switched provider network, the network element comprising:

input and output interfaces for providing packet transmission along a first path between a source customer edge node and a destination customer edge node through said provider network; and packet switching means for switching packet traffic in accordance with address information contained in each packet, wherein said packet switching means are adapted to perform Media Access Control (MAC) address learning to allow packet transmission in reverse direction along the same path and wherein said packet switching means are further adapted to flush addresses previously learned upon reception of a data plane protocol message containing an address withdrawal message in the form of an Ethernet OAM message.

* * * * *